Patented Feb. 19, 1946

2,395,135

UNITED STATES PATENT OFFICE 2,395,135

PYRROLE AZO DYESTUFFS

Mordecai Mendoza and Maurice Arthur Thorold Rogers, Blackley, Manchester, England, assignors to Imperial Chemical Industries Limited, a corporation of Great Britain No Drawing. Application April 9, 1943, Serial No. 482,480. In Great Britain July 13, 1942

8 Claims. (Cl. 260—151)

The present invention relates to the manufacture of new azo dyestuffs and more particularly to the manufacture of new azo dyestuffs derived from 2:4-diarylpyrroles as defined below.

We have found that 2:4-diarylpyrroles which may carry substituents, for example, an aryl, alkyl, alkylamino, benzylideneamino or acylamino radical, in the 3-position, possess a reactive hydrogen atom in the 5-position which enables them to interact readily with diazonium salts with the production of azo compounds. The present 2:4-diarylpyrroles then constitute coupling components eminently suitable for use in the production of azo dyestuffs. Some of the azo dyestuffs so made are insoluble in water and are useful as pigments.

According to the invention azo dyestuffs are manufactured by a process comprising coupling a diazotised arylamine with a 2:4-diarylpyrrole which may or may not be substituted in the 3-position.

The azo dyestuffs which have been made according to the invention, especially those from arylamines containing in an ortho-position to the amino group a group which is reactive to metals, e. g., a carboxy or hydroxy group, or a group convertible thereto, are capable of being converted into metal complexes or metallised. The metallisation of said dyestuffs either in substance or on the fibre constitutes a further feature of the present invention.

As arylamines there may be employed in accordance with the present invention, for example, m-chloroaniline, 4-nitro-2-aminoanisole, 2:5-dichloroaniline, 5-nitro-2-aminoanisole, 3-aminocarbazole, 1-amino-4-benzoylamino-2:5-dimethoxyaniline, 3-nitro-4-aminotoluene, α-naphthylamine, α-aminoanthraquinone, o-dianisidine, 4:4'-diaminodiphenylamine, 2-nitro-4-chloroaniline, 3-nitro-4-aminotolueneazocresidine, aniline-2:5-disulphonic acid, 4-chloro-2-aminotoluene, 5-nitro-2-aminotoluene, 3:3'-dichlorobenzidine, picramic acid, benzidine, benzidine-2:2'-disulphonic acid, 4:4'-diaminostilbene-2:2'-disulphonic acid, 4-aminoazobenzene-4'-sulphonic acid, benzidine diglycollic acid (4:4'-diamino-3:3'-dicarboxymethoxydiphenyl), 2-chloro-4-aminophenetole, 2-amino-5-methylthiazole, 4-aminodiphenyl, 3-amino-2:5-diphenylpyrrole, 4-chloro-2-aminophenyl-6-sulphonic acid, 4-sulpho-2-aminobenzoic acid, 5-nitro-2-aminophenol, 1-amino-2-naphthol-4-sulphonic acid, anthranilic acid, 4-nitro-2-aminophenol and 4-chloro-2-aminophenol.

The following 2:4-diarylpyrroles may be employed, for example, in the present invention: 2:4-diphenylpyrrole, 2-phenyl-4-(p-methoxyphenyl)pyrrole, 2-(p-methoxyphenyl)-4-phenylpyrrole, 2-(m-hydroxyphenyl)-4-phenylpyrrole, 2-(o-chlorophenyl)-4-phenylpyrrole, 2-(p-acetylaminophenyl)-4-phenylpyrrole, 2-α-naphthyl-4-phenylpyrrole, 2-phenyl-4-β-naphthylpyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole. Some of these are new compounds, and their preparation is described and claimed in the copending application by one of us, namely M. A. T. Rogers, Serial No. 457,229 now Patent No. 2,382,915, filed September 3, 1942. Besides the 2:4-diarylpyrroles just enumerated, there may be used, for instance, their mono- or disulphonic acids of which may be mentioned 2:4-diphenylpyrrole monosulphonic acid and 2:4-diphenylpyrrole disulphonic acid, whose preparation in turn is described and claimed in the copending application of M. A. T. Rogers, Serial No. 482,479 now Patent No. 2,382,917, filed on the same date herewith.

From the present 2:4-diarylpyrroles there may be made according to the present invention not only monoazo dyestuffs, e. g., by coupling diazotised aniline-2:5-disulphonic acid with 2:4-diphenylpyrrole, but also polyazo dyestuffs. The latter can be made by coupling a tetrazotised diamine, e. g., benzidine, with two molecular proportions of 2:4-diphenylpyrrole in which case a primary disazo dyestuff is obtained or for instance by utilising as diazo component an arylamine which already contains one azo group, e. g., by coupling diazotised 4-aminoazobenzene-4'-sulphonic acid with 2:4-diphenylpyrrole disulphonic acid, when a secondary disazo dyestuff is produced. Additional azo linkages may be incorporated in the dyestuffs also, by, for instance, choosing a diazo or coupling component that contains a group which is convertible into a diazotisable amino group, e. g., an acylamino group which is capable of being hydrolysed to an amino group which can be diazotised and coupled with a further molecular proportion of a coupling component.

The dyestuffs of the present invention are applicable to various purposes including the dyeing of both wool and cotton. Thus the present dyestuffs comprise both acid wool dyestuffs, e. g., aniline 2:5-disulphonic acid diazotised and coupled with 2:4-diphenylpyrrole and direct cotton dyestuffs, e. g., 4:4'-diaminostilbene 2:2'-disulphonic acid tetrazotised and coupled with 2:4-diphenylpyrrole disulphonic acid. In the case of such classes of dyestuff it is necessary that there be present in the diazo or coupling components a sufficiently of solubilising groups, e. g., at least one sulphonic acid group. In the absence of solubilising groups, azo pigments are obtained, e. g., by coupling diazotised 4-chloro-2-animotoluene with 2:4-diphenylpyrrole.

Furthermore, as already indicated above, the present dyestuffs, especially those which are derived from arylamines possessing a group reactive to metals, e. g., a carboxy or hydroxy group, or group convertible thereto in an ortho-position to the amino group, are according to a further feature of the invention metallised. Thus the present dyestuffs comprise metallisable wool dyestuffs and metallisable cotton dyestuffs. The metallisable wool dyestuffs include, for example, chromable wool dyestuffs which can be applied to the wool fibre either by the meta-chrome or the after-crome process, for instance, the dyestuff made by coupling diazotised picramic acid with 2:4-diphenylpyrrole. By way of a metallisable cotton dyestuff, that is to say, a dyestuff which not only possesses affinity for cotton, but also is capable of being converted into metal complexes, we mention the dyestuff made by coupling tetrazotised 4:4'-diamino-3:3'-dicarboxymethoxydiphenyl with two molecular proportions of 2:4-diphenylpyrrole disulphonic acid. This dyestuff dyes cotton in bluish violet shades which become blue on after-coppering.

The present dyestuffs are of various shades, e. g., orange, brown, reddish brown and blue and of good fastness properties, particularly in the case of the metallised dyestuffs.

The following examples illustrate but are not intended to restrict the scope of the invention. The parts are parts by weight.

*Example 1*

29.7 parts of the disodium aniline-2:5-disulphonate dissolved in 400 parts of water are diazotised at 15° C. by the addition of 45 parts of 26% hydrochloric acid and 6.9 parts of sodium nitrite. The resulting solution is added with stirring during 5 minutes to a suspension of 2:4-diphenylpyrrole obtained by dissolving 21.9 parts of 2:4-diphenylpyrrole in 370 parts of sulphuric acid (160° Tw.) and pouring into 500 parts of crushed ice. After stirring for 1 hour 100 parts of sodium chloride are added. The new dyestuff is filtered off and dried. It is a dark brown powder which dyes wool in orange-brown shades from an acid bath.

*Example 2*

21.9 parts of 2:4-diphenylpyrrole are dissolved in 370 parts of sulphuric acid (160° Tw.) and the solution is added with stirring during 5 minutes to a solution of diazotised 4-chloro-2-aminotoluene prepared by diazotising 17.7 parts of 4-chloro-o-toluidine hydrochloride with 20 parts of 26% hydrochloric acid, and 6.9 parts of sodium nitrite, 900 parts of ice being used for cooling. After stirring for ½ hour, the new dyestuff is filtered off, washed with water until substantially free from mineral acid and dried at 50° C.

It is an orange-brown powder insoluble in water but soluble in linseed oil or alcohol to a yellowish orange solution.

If instead of the solution of diazotised 4-chloro-o-toluidine there is used the solution obtained by diazotising 15.2 parts of 3-nitro-4-toluidine, the product is a red-brown powder insoluble in water but soluble in alcohol or linseed oil to an orange solution. If the solution obtained by diazotising 12.6 parts of 3:3'-dichlorobenzidine is used, the product is a purplish-black powder insoluble in water and soluble in alcohol or linseed oil to a rose-red solution.

*Example 3*

22.1 parts of the sodium salt of 4:6-dinitro-2-aminophenol dissolved in 300 parts of water are diazotised at 15° C. with 35 parts of 26% hydrochloric acid and 6.9 parts of sodium nitrite. The resulting suspension of the diazo compound is added to a stirring solution of 32.1 parts of the sodium salt of the monosulphonic acid of 2:4-diphenylpyrrole in 300 parts of water containing 25 parts of anhydrous sodium carbonate. Coupling is suffered to proceed for 4 hours. The new dyestuff is then filtered off, pressed thoroughly and dried.

The new dyestuff is readily soluble in water and when dyed on wool yields reddish violet shades which are converted to greenish grey on afterchroming. The new dyestuff is particularly suited for application by the metachrome process, i. e., by the single bath chroming process. The chromed shades are very fast to washing, milling and potting.

*Example 4*

9.2 parts of benzidine are tetrazotised with 30 parts of 26% hydrochloric acid and 6.9 parts of sodium nitrite in 400 parts of ice and water and added at 15° C. to a solution of 42.3 parts of disodium 2:4-diphenylpyrrole disulphonate in 500 parts of water. Coupling occurs immediately. Sufficient sodium carbonate is then added to make the mixture just alkaline to litmus, followed by 100 parts of sodium chloride. The new dyestuff is filtered off and dried. It is a reddish brown powder which dissolves in water to a bluish red solution and dyes cotton in bordeaux shades. If in place of benzidine there are used 18.5 parts of 4:4'-diaminostilbene-2:2'-disulphonic acid, a dyestuff is obtained which dyes cotton in bluer shades.

*Example 5*

27.7 parts of 4-aminoazobenzene-4'-sulphonic acid are diazotised with 30 parts of 26% hydrochloric acid, 6.9 parts of sodium nitrite and 500 parts of water and added to a solution of 42.3 parts of the disodium 2:4-diphenylpyrrole disulphonate in 500 parts of water. After stirring for 5 minutes, sufficient sodium carbonate is added to make the mixture just alkaline to litmus followed by 200 parts of sodium chloride. The new dyestuff is filtered off and dried. It is a brownish red powder which dissolves in water to a red solution and dyes cotton in bluish red shades.

*Example 6*

16.6 parts of benzidine diglycollic acid (4:4'-diamino-3:3'-dicarboxymethoxydiphenyl) are tetrazotised with 30 parts of 26% hydrochloric acid, 6.9 parts of sodium nitrite and 400 parts of ice and water at 15° C., and added to a solution of 42.3 parts of disodium 2:4-diphenylpyrrole disulphonate in 500 parts of water. After stirring for 5 minutes sufficient sodium carbonate is added to make the mixture just alkaline to litmus, followed by 200 parts of sodium chloride. The new dyestuff is filtered off and dried. It is a dark brown powder which dissolves in water to a bluish red solution and dyes cotton in bluish violet shades which become blue on after-coppering.

We claim:
1. Process for the manufacture of azo dyestuffs comprising coupling a diazotised arylamine with a 2:4-diarylpyrrole wherein the aryl radicals possess no more than 10 carbon atoms in their respective nuclear structures, and wherein the pyrrole ring has no substituents in the 5-position.
2. Process according to claim 1 in which the 2:4-diarylpyrrole is 2:4-diphenylpyrrole.
3. Azo dyestuffs corresponding to the formula R—N=N—Q, wherein R—N=N— represents the diazo radical of an arylamine, and Q stands for the radical of a 2:4-diarylpyrrole whose aryl members in 2,4-positions possess no more than 10 carbon atoms in their respective nuclear structures, and wherein the —N=N— bridge is coupled to the 5-position of the pyrrole ring.
4. Monoazo dyestuffs corresponding to the formula A—N=N—Q, wherein A—N=N— stands for the diazo radical of an aromatic amine, and Q stands for the radical of a 2:4-diarylpyrrole whose aryl members in 2,4-positions possess no more than 10 carbon atoms in their respective nuclear structures, and wherein the —N=N— bridge is coupled to the 5-position of the pyrrole ring.
5. Diazo dyestuffs corresponding to the formula

Q—N=N—D—N=N—Q wherein —N=N—D—N=N— represents the bisdiazo radical of an aromatic diamine, and Q stands for the radical of a 2:4-diarylpyrrole whose aryl members in 2,4-positions possess no more than 10 carbon atoms in their respective nuclear structures, and wherein the —N=N— bridges are coupled to the 5-positions of the pyrrole rings.
6. The azo dyestuff corresponding to the formula:

4:6-dinitro-2-aminophenol→2:4-diphenylpyrrole wherein the arrow signifies diazotised and coupled with, and wherein the coupling is in the 5 position of the pyrrole ring.
7. The azo dyestuff corresponding to the formula:

4:4'-diamino-stilbene-2:2'-disulphonic acid ⇌ 2:4-diphenylpyrrole disulphonic acid wherein the arrows signify tetrazotised and coupled with, and wherein the coupling is in the 5 position of the pyrrole ring.
8. The azo dyestuff corresponding to the formula:

4:4'-diamino-3:3'-dicarboxymethoxydiphenyl ⇌ 2:4-diphenylpyrrole disulphonic acid wherein the arrows signify tetrazotised and coupled with, and wherein the coupling is in the 5 position of the pyrrole ring.

MORDECAI MENDOZA.
MAURICE ARTHUR THOROLD ROGERS.